United States Patent [19]
Shibahara et al.

[11] Patent Number: 5,518,819
[45] Date of Patent: May 21, 1996

[54] RUBBER COMPOSITION FOR A VIBRATION INSULATOR AND A RUBBER VIBRATION INSULATOR THEREOF

[75] Inventors: Akihiro Shibahara, Komaki; Hajime Kato, Kasugai, both of Japan

[73] Assignee: Tokai Rubber Industries, Ltd., Aichi, Japan

[21] Appl. No.: 428,832

[22] Filed: Apr. 25, 1995

Related U.S. Application Data

[63] Continuation of Ser. No. 102,902, Aug. 6, 1993, abandoned.

[30] Foreign Application Priority Data

Aug. 10, 1992 [JP] Japan .................... 4-212937
Nov. 17, 1992 [JP] Japan .................... 4-306945
Jul. 21, 1993 [JP] Japan .................... 5-180264

[51] Int. Cl.⁶ .................... C08K 5/20; B32B 15/06; H01B 17/26
[52] U.S. Cl. .................... 428/465; 174/152 R
[58] Field of Search .................... 428/465; 174/152 R; 524/227, 230

[56] References Cited

U.S. PATENT DOCUMENTS

| | | | |
|---|---|---|---|
| 2,325,947 | 8/1943 | Garvey | 524/232 |
| 3,562,291 | 2/1971 | Lutzmann | 524/232 |
| 3,928,210 | 12/1975 | Peterson | 252/8.1 |
| 4,500,666 | 2/1985 | Wada | 524/230 |
| 4,882,394 | 11/1989 | Kreiner | 525/332.7 |
| 5,256,489 | 10/1993 | Maringer et al. | 428/450 |

FOREIGN PATENT DOCUMENTS 1569233.8 9/1969 Germany .
1122063 7/1968 United Kingdom .

*Primary Examiner*—Kriellion S. Morgan
*Attorney, Agent, or Firm*—Armstrong, Westerman, Hattori, McLeland and Naughton

[57] ABSTRACT

The present invention is related to a rubber vibration insulator comprising a rubber composition for a rubber insulator wherein at least one selected from unsaturated fatty acid amide and N-substituted fatty acid amide is contained. For this reason, friction coefficient can be greatly reduced in wide temperature range including low temperature range and high temperature range, not in a narrow temperature range near to a normal temperature. Furthermore, the above unsaturated fatty acid amide can be easily melted in a rubber compound so as to be mixed into a normal kneading operation resulting in a superior workability.

4 Claims, 2 Drawing Sheets

RUBBER COMPOSITION FOR A VIBRATION INSULATOR AND A RUBBER VIBRATION INSULATOR THEREOF

This application is a Continuation application of Ser. No. 08/102,902, filed Aug. 6, 1993, now abandoned.

FIELD OF THE INVENTION

The present invention relates to a rubber composition for a vibration insulator, which is used as a material for a stabilizer bushing, a rear suspension bushing or the like to prevent vibration in a vehicle such as an automobile, and a rubber vibration insulator thereof.

BACKGROUND OF THE INVENTION

A rubber vibration insulator for an automobile, for example, an engaged-type bushing such as a stabilizer bushing or a rear suspension bushing causes noise when launching, sudden breaking, turning to the right or left and the like by a stick-slip phenomenon between a fitting and a rubber bushing surface, in which a countermeasure is required.

As a countermeasure for the above, various methods are studied to lower friction coefficient on the rubber bushing surface. For example, it is employed ① to add wax in the rubber composition or, ② add liquid silicone oil in rubber composition or the like.

However, the above method ① has a problem in that the degree to decrease friction coefficient is not enough, or the effect is only obtained within a very narrow temperature range (at an ordinary temperature) even if reduction of friction coefficient is obtained by adding some kind of fatty acid amide jointly therein. In other words, sufficient reduction of friction coefficient cannot be obtained at a low or high temperature. In the meantime, the above method ②, wherein silicone oil is added therein, has a problem that compatibility with a rubber component is poor, resulting in remarkably poor kneading workability with a rubber compound and a difficulty in mass producing even though it has the superior effect in the reduction of friction coefficient.

OBJECT OF THE INVENTION

The object of this invention is to provide a rubber composition for a vibration insulator (hereinafter referred to sometimes as a rubber composition) and a rubber vibration insulator thereof, wherein friction coefficient can be greatly reduced not only within a narrow temperature range such as an ordinary temperature but also in wider temperature range, and moreover, production operationability is superior.

SUMMARY OF THE INVENTION

To accomplish the above object, first aspect of the present invention is a rubber composition wherein at least one selected from unsaturated fatty acid amide and N-substituted unsaturated fatty acid amide is contained in a base rubber material, while second aspect is a rubber vibration insulator comprising a rubber composition for a vibration insulator wherein at least one selected from unsaturated fatty acid amide and N-substituted unsaturated fatty acid amide is contained.

That is, a series of studies has been conducted for the purpose of developing a rubber composition for a vibration insulator having the effect of reducing friction coefficient sufficiently over a wider temperature range and also superior kneading workability. As a result, it is found out that when either or both of unsaturated fatty acid amide or/and N-substituted unsaturated fatty acid amide is/are mixed in a rubber component, friction coefficient can be reduced sufficiently in a low temperature range or a high temperature range, not within a narrow temperature range at an ordinary temperature in the prior method. Furthermore, it is also discovered that when adopting both of the above compounds, friction coefficient can be reduced sufficiently in a wide temperature range from a low temperature to a high temperature and at the same time, normal kneading operation can be materialized in kneading because these compounds can be dissolved in the rubber component. As a result, the present invention has been achieved.

The present invention is now described in further detail.

A rubber composition in the present invention can be obtained by mixing either one or both of the unsaturated fatty acid amide and the N-substituted unsaturated fatty acid amide into a base rubber material.

The above rubber, with no specific limitation, are conventionally known types such as natural rubber, various kinds of synthetic rubber and the like.

The above unsaturated fatty acid amide is represented as a general formula $RCONH_2$ (R is unsaturated fatty acid alkyl group), wherein, preferably, molecular weight is 250 to 350 and melting point is not more than 90° C. Namely, if one whose melting point is more than 90° C. is adopted, sufficient effect of reducing friction coefficient cannot be obtained in a low temperature range. Specifically, there are oleic amide, erucic amide and the like, which are used solely or in combination. Especially, oleic amide represented as the following chemical formula is preferable.

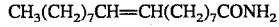

$$CH_3(CH_2)_7CH=CH(CH_2)_7CONH_2$$

The above N-substituted unsaturated fatty acid amide is represented as a general formula $RCONHR'NHCOR$ (R is unsaturated fatty acid alkyl group, R' is alkylene group), wherein, preferably, molecular weight is 550 to 650 and melting point is 100° to 130° C. This is because the effect of reducing friction coefficient cannot be obtained under the atmosphere of high temperature in case of melting point less than 100° C., and also because the effect of reducing friction coefficient becomes difficult to obtain when the melting point is over 130° C. Specifically, when there are N,N'-ethylene-bis oleic amide, N,N'-dioleyl adipic acid amide and the like, which are used solely or in combination. Especially, N,N'-ethylene-bis oleic amide represented as the following chemical formula is preferable.

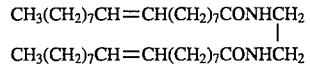

$$CH_3(CH_2)_7CH=CH(CH_2)_7CONHCH_2$$
$$|$$
$$CH_3(CH_2)_7CH=CH(CH_2)_7CONHCH_2$$

Antioxidant, vulcanization accelerator, loading material and the like can be appropriately mixed into the rubber composition in the present invention according to the case, in addition to rubber material component, vulcanizing agent, unsaturated fatty acid amide and substitute unsaturated fatty acid amide.

The rubber composition for a vibration insulator in the present invention, for example, can be obtained in the following method. That is, it is obtained if either or both of unsaturated fatty acid amide or/and N-substituted unsaturated fatty acid amide is/are added at the same time when mixing each compounding agent into masticated material rubber. It is preferred that the ratio of the unsaturated fatty amide and N-substituted fatty acid amide is set within the following range. ① When only one of unsaturated fatty acid amide or N-substituted fatty acid amide is employed, it is preferred to set the ratio in 1 to 20 weight % (abbreviated as % hereinafter) of the total rubber compound in either case. Namely, the effect of reducing friction coefficient is not sufficient at a low temperature if the ratio of unsaturated fatty acid amide is less than 1%, while the effect is not sufficient at a high temperature not less than 70° C. if the ratio of N-substituted unsaturated fatty acid amide is less than 1%. On the other hand, if the ratio of unsaturated fatty acid amide or N-substituted unsaturated acid amide is over 20% in either case, there is a tendency that physical properties of vulcanized rubber, vibration noise and the like are deteriorated. In addition, ② when both two of unsaturated fatty acid amide and N-substituted fatty acid amide are employed, it is preferred that the total amount thereof is set within 1 to 20% of the total rubber compound and also each of them is contained at the ratio of not less than 1.0%. Namely, the effect of reducing friction coefficient is not sufficient both at a low temperature and a high temperature not less than 70° C. if the ratio of total amount of both two is less than 1%. On the other hand, if the ratio of both of them is over 20%, there is a tendency that physical properties of vulcanized rubber, vibration noise and the like are deteriorated. Furthermore, if the ratio of containing unsaturated fatty acid amide is less than 1.0%, the effect of reducing friction coefficient is not sufficient at a low temperature; whereas, if the ratio of N-substituted unsaturated fatty acid amide is not more than 1.0%, the effect of reducing friction coefficient is not sufficient at a high temperature not less than 70° C.

A rubber vibration insulator in the present invention can be obtained by adopting the above rubber composition and forming the composition into a desired shape according to the prior method. For example, when manufacturing a rubber vibration insulator article such as a stabilizer bushing, unsaturated fatty acid amide percolates on the surface of rubber article to form a coat layer, which brings about the reduction of friction coefficient at a low temperature. However, the unsaturated fatty acid amide precipitated thereon is melted again at a high temperature not less than about 70° C., resulting in insufficient reduction of friction coefficient. In the meantime, when N-substituted unsaturated fatty amide is added in addition to the above unsaturated fatty acid amide, the melting of the unsaturated fatty acid amide is controlled by the addition of the N-substituted unsaturated fatty acid amide, wherein the reduction of friction coefficient can be materialized at a high temperature. Thus, when adopting both of unsaturated fatty acid amide and N-substituted fatty acid amide, it is more preferable because the effect of reducing friction coefficient is in wide condition range, not in either of low-temperature range or high temperature range.

As a rubber insulator product obtained by adopting the rubber vibration insulator composition of the present invention, for example, there is a stabilizer bushing. FIG. 1 illustrates the condition where this stabilizer bushing 10 is installed. The stabilizer bushing 10, wherein a stabilizer bar 14 is inserted in an inner hole 12 thereof, is fixed to a vehicle body 18 by fitting 16, bolts 20 and nuts 22. In the figure, 13 is a cutting plane line, which is formed when the stabilizer bar 14 is inserted into the stabilizer.

EFFECTS OF THE INVENTION

As aforementioned, the present invention is related to a rubber vibration insulator obtained by adopting a rubber composition for a vibration insulator containing at least one selected from unsaturated fatty acid amide and N-substituted unsaturated fatty acid amide. For this reason, the effect of reducing friction coefficient greatly on rubber products in wider temperature range, not only in narrow temperature range near to ordinary temperature as in a conventional method, can be realized. And also, since both of the above unsaturated fatty acid amide and N-substituted unsaturated fatty acid amide can be melted easily into rubber compound, they can be blended or mixed therein in normal kneading operation, resulting in superior workability. Therefore, friction coefficient of a rubber vibration insulator for an automobile, such as a stabilizer bushing, a rear suspension bushing and the like, can be widely reduced, resulting in effective prevention of noise caused by a stick-slip phenomenon.

Figure 1:
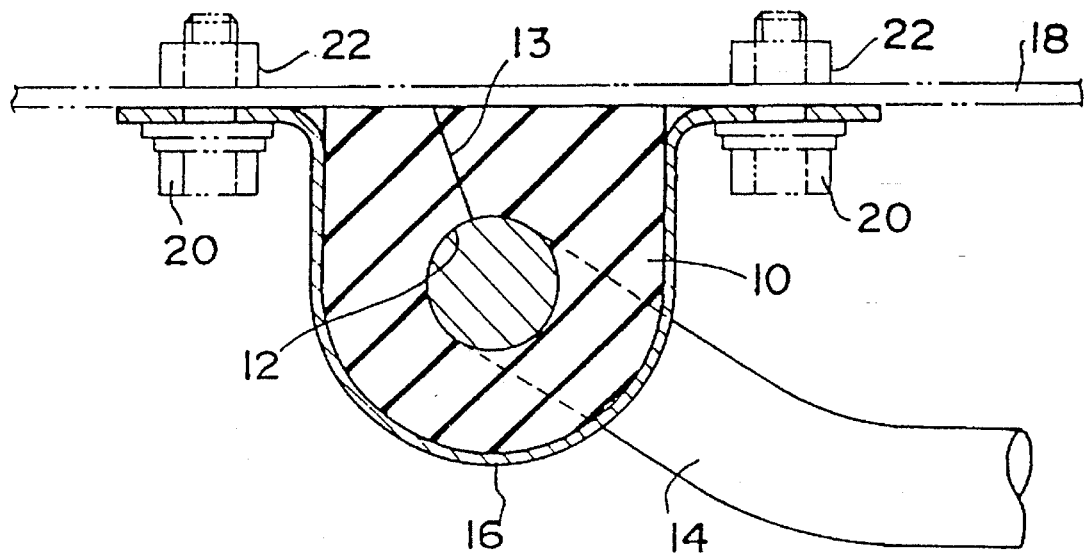
FIG. 1 illustrates a state wherein a stabilizer bushing is installed.
Figure 2:
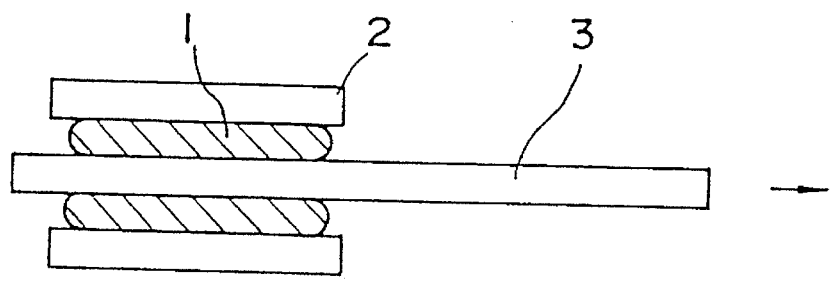
FIG. 2 is a sectional view of a test piece adopted for pull-out strength test.

The following examples and comparative examples are further illustrative of the present invention.

(1) In the case when only unsaturated fatty acid amide is adopted as lubricant.

EXAMPLE 1 TO 6

100 weight parts (abbreviated as parts hereinafter) of natural rubber, 5 parts of zinc oxide, 2 parts of stearic acid, 1 part of antioxidant (3C, a product of Seikokagaku-sha), 1 part of antioxidant (RD, a product of Seikokagaku-sha), 85 parts of HAF carbon black, 5 parts of naphthene oil, 1 part of vulcanization accelerator CZ, 2 parts of sulfur were mixed with lubricant specified in the following table 1 and 2, and then kneaded in the known method. Thus, a rubber composition was obtained. In addition, oleic amide having 281 molecular weight and of 73° to 76° C. melting point, was adopted in the table 1 and 2. In the meantime, erucic amide as is 338 in molecular weight and 80° to 84° C. of melting point was adopted.

TABLE 1

|  | EXAMPLE | | | |
|---|---|---|---|---|
|  | 1 | 2 | 3 | 4 |
| oleic amide (part) | 3.0 (1.5) | 10.0 (4.7) | 20.0 (9.0) | 50.0 (19.8) |

NB.
Numbers in ( ) show the ratio (%) to entire rubber compound.

TABLE 2

|  | EXAMPLE | |
|---|---|---|
|  | 5 | 6 |
| erucic amide (part) | 10.0 (4.7) | 20.0 (9.0) |

TABLE 2-continued

| | EXAMPLE | |
|---|---|---|
| | 5 | 6 |

NB.
Numbers in ( ) show the ratio (%) to entire rubber compound.

(2) In the case when only N-substituted unsaturated fatty acid is adopted as lubricant.

EXAMPLE 7 TO 10

100 weight parts of natural rubber, 5 parts of zinc oxide, 2 parts of stearic acid, 1 part of antioxidant 3C, 1 part of antioxidant RD, 85 parts of HAF carbon black, 5 parts of naphthene oil, 1 part of vulcanization accelerator CZ, 2 parts of sulfur were mixed with lubricant specified in the following table 3, and then kneaded in the known method. Thus, a vibration composition for a vibration insulator was obtained. In addition, N,N'-ethylene-bis oleic amide having molecular weight 588 and melting point of 117° to 122° C. was adopted in table 3. In the meantime, N,N'-dioleyl adipic acid amide having molecular weight 616 and melting point of 117° to 121° C. was adopted.

TABLE 3

| | EXAMPLE | | | |
|---|---|---|---|---|
| | 7 | 8 | 9 | 10 |
| N,N'-ethylene-bis oleic amide | 3.0 (1.5) | 50.0 (19.8) | — | — |
| N,N'-dioleyl adipic acid amide | — | — | 3.0 (1.5) | 50.0 (19.8) |

NB.
Numbers in ( ) show the ratio (%) to entire rubber compound.

(3) In the case when both of unsaturated fatty acid and N-substituted unsaturated fatty acid are adopted as lubricant.

EXAMPLE 11 TO 14

100 weight parts of natural rubber, 5 parts of zinc oxide, 2 parts of stearic acid, 1 part of antioxidant 3C, 1 part of antioxidant RD, 85 parts of HAF carbon black, 5 parts of naphthene oil, 1 part of vulcanization accelerator CZ, 2 parts of sulfur were mixed with lubricant specified in the following table 4, and then kneaded in the known method. Thus, a vibration composition for a vibration insulator was obtained. In addition, oleic acid amide having molecular weight 281 and melting point of 73° to 76° C., erucic amide having molecular weight 338 and melting point of 80° to 84° C., N,N'-ethylene-bis oleic amide having molecular weight 588 and melting point of 117° to 122° C. were adopted in table 4. In the meantime, N,N'-dioleyl adipic acid amide having molecular weight 616 and melting point of 117° to 121° C. was adopted.

TABLE 4

| | EXAMPLE | | | |
|---|---|---|---|---|
| | 11 | 12 | 13 | 14 |
| oleic amide | 3.0 (1.5) | 25 (9.9) | 3.0 (1.5) | — |
| erucic amide | — | — | — | 3.0 (1.5) |
| N,N'-ethylene-bis oleic amide | 3.0 (1.5) | 25 (9.9) | — | 3.0 (1.5) |
| N,N'-dioleyl adipic acid amide | — | — | 3.0 (1.5) | — |

NB.
Numbers in ( ) shows the ratio to entire rubber compound in %.

COMPARATIVE EXAMPLES 1 TO 6

100 weight parts of natural rubber, 5 parts of zinc oxide, 2 parts of stearic acid, 1 part of antioxidant 3C, 1 part of antioxidant RD, 85 parts of HAF carbon black, 5 parts of naphthene oil, 1 part of vulcanization accelerator CZ, 2 parts of sulfur were mixed with lubricant at the ratio specified in the following table 5 and 6, and then kneaded in the known method. Thus, a rubber composition was obtained. In addition, numbers in ( ) of TABLE 5 and 6 shows the ratio (%) to entire rubber compound.

TABLE 5

| | COMPARATIVE EXAMPLES | | | |
|---|---|---|---|---|
| | 1 | 2 | 3 | 4 |
| behenic acid *1 amide | — | 10 (4.7) | — | 25 (9.9) |
| N,N'-ethylene-bis stearic acid amide *2 | — | — | 10 (4.7) | 25 (9.9) |
| silicone oil *3 | — | — | — | — |

NB.
*1: saturated fatty acid amide
*2: N-substitutional saturated acid amide
*3: kinematic viscosity 20 cm²/sec

TABLE 6

| | COMPARATIVE EXAMPLES | |
|---|---|---|
| | 5 | 6 |
| behenic acid *1 | — | — |
| N,N'-ethylene-bis stearic acid amide *2 | — | — |
| silicone oil *3 | — | 10 (4.7) |
| wax *4 | 10 (4.7) | |

NB.
*1: saturated fatty acid amide
*2: N-substitutional saturated acid amide
*3: kinematic viscosity 20 cm²/sec
*4: micro-crystalline wax A rubber composition of EXAMPLES and COMPARATIVE EXAMPLES was thus obtained, adopted, and formed in a desired shape by press vulcanization at 150° C. and for 30 minutes to manufacture a rubber vibration insulator of 40 mm by 25 mm in 8 mm thick. And then, physical properties of this rubber vibration insulator in a normal state, friction coefficient at three condition of room temperature (25° C.), 0° C. and 70° C., roll workability, compression set, dynamic magnifying power and loss factor were measured according to the following method. The results are shown in the following table 7 to 11.

The above properties ($M_{100}$, $T_B$, $E_B$, $H_S$) in a normal state is according to JIS K 6301.

$M_{100}$: 100% tensile stress
$T_B$: tensile strength
$E_B$: tensile elongation
$H_S$: hardness The above friction coefficient was obtained by press-vulcanizing a rubber composition at 150° C. for 20 minutes to manufacture a test sample of 40 mm by 25 mm in 8 mm thick and measuring pull-out strength at defined temperatures (room temperature of 25° C., 0° C. and 70° C.). That is, iron plate 3 in 8.0 mm thick (surface roughness 6 μm, maximum surface roughness 9 μm) was put between test pieces 1 and presser bars 2 were combined thereon and then these were fixed firmly with bolts and nuts, and finally these were subjected to Schopper's fiber tensile tester, whereby load when one either of the upper or lower part was pull out (velocity of pulling out: 50 mm/min) were considered as pull-out strength.

The above roll workability was valued by observing a wrapping property of rubber to a roll.

Figure 3:
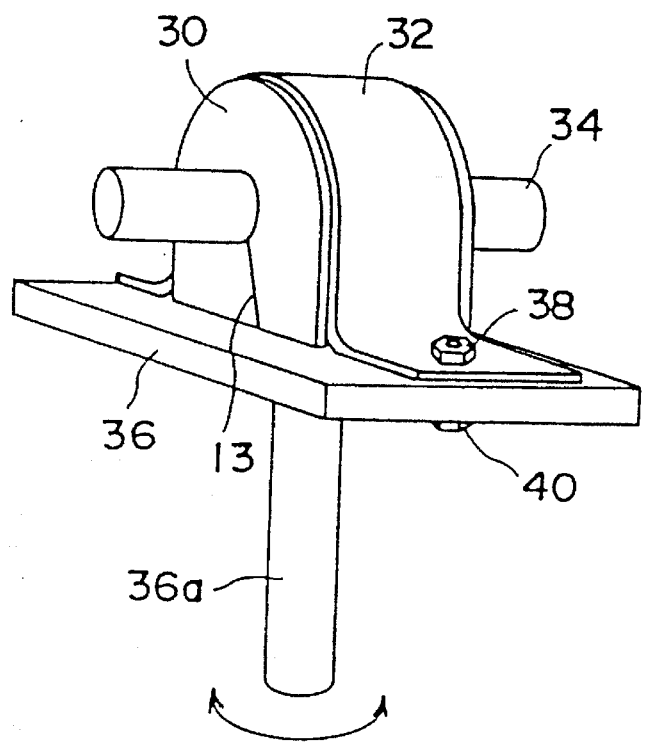
FIG. 3 illustrates how to value noise in a noise occurrence test and FIG. 4 illustrates a side view of a measuring jig for measuring static spring constant and dynamic spring constant.

The presence of the above noise occurrence was measured and valued in the following evaluating test. That is, as shown in FIG. 3, a test sample is manufactured by installing a stabilizer bushing 30 inserted with a stabilizer bar 34 on a test jig 36 with fittings 32 and then fixing with bolts 38 and nuts 40. And also, a stabilizer bar 34 was fixed and then the presence of noise occurrence was checked when reciprocating bar 36a of a test jig 36 by hand in the direction shown with an arrow at the temperature of room temperatures (25° C.) and 0° C.

The above compression set was measured according to JIS K 6301 under each condition of 70° C. for 22 hours and at 100° C. for 22 hours.

Dynamic spring constant and static spring constant were measured in the following methods and then the value of dividing dynamic spring constant by static spring constant was calculated so that the above kinematic viscosity was shown.

[static spring constant]

Figure 4:
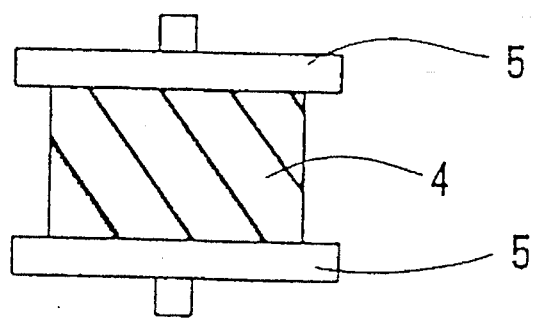

As shown in FIG. 4, thin cylindrical disk-like fittings 5 of 60 mm diameter and 6 mm height were installed both on the upper side and lower side of thick cylindrical disk-like rubber vibration insulator 4 of 50 mm diameter and 25 mm height. The rubber vibration insulator 4 was compressed by 7 mm in cylindrical direction and then compressed again in the same manner. From the load-deformation diagram (not shown) based upon the result of being compressed secondly, each load was measured on a going-half curve thereof at two deformation points of 1.5 mm and 3.5 mm and then the static spring constant was calculated.

[dynamic spring constant]

After the test piece (shown in FIG. 4) for measurement used in the above static spring constant, the very test piece was also used here, as shown in FIG. 4, this rubber vibration insulator 4 was compressed in cylindrical direction by 2.5 mm. Centered in this position of being compressed by 2.5 mm, fixed varied harmonized compressed vibration in 0.05 mm amplitude was given from the lower with frequency of 100 Hz and then dynamic load was detected by upper load cell (not shown) and finally dynamic spring constant was calculated according to JIS K 6394.

In measuring the above loss factor, a test piece shown in FIG. 4 for measurement as used in the above static spring constant was used. The rubber vibration insulator 4 was compressed in cylindrical direction by 2.5 mm. Centered in this position of being compressed by 2.5 mm, fixed varied harmonized compressed vibration in 0.05 mm amplitude was given from the lower with frequency of 15 Hz and then dynamic load was detected by upper load cell (not shown) and finally phase angle was sought. And then loss factor was calculated in accordance with JIS K 6394.

TABLE 7

|  | EXAMPLE | | | | | |
|---|---|---|---|---|---|---|
|  | 1 | 2 | 3 | 4 | 5 | 6 |
| Physical properties in a normal state | | | | | | |
| $M_{100}$ (kgf/cm²) | 84 | 63 | 52 | 46 | 64 | 53 |
| $T_B$ (kgf/cm²) | 193 | 180 | 169 | 162 | 179 | 173 |
| $E_B$ (%) | 273 | 277 | 344 | 415 | 271 | 339 |
| $H_S$ (JIS A) | 79 | 77 | 76 | 74 | 77 | 75 |
| Compression set | | | | | | |
| 70° C. × 22 Hr (%) | 24 | 27 | 34 | 50 | 26 | 35 |
| 100° C. × 22 Hr (%) | 45 | 48 | 55 | 60 | 49 | 55 |
| Dynamic characteristics | | | | | | |
| $Kd_{100}/Ks$ | 3.46 | 3.82 | 3.95 | 4.05 | 3.80 | 3.97 |
| loss factor | 0.256 | 0.255 | 0.268 | 0.281 | 0.252 | 0.269 |
| Pull-out strength (friction coefficient) (kgf) | | | | | | |
| Room temperature | 55 | 54 | 54 | 50 | 57 | 56 |
| 0° C. | 84 | 68 | 72 | 69 | 77 | 74 |
| 70° C. | 104 | 102 | 101 | 95 | 110 | 105 |
| Roll workability | ○ | ○ | ○ | ○ | ○ | ○ |
| Occurrence of noise | | | | | | |
| Room temperature | None | None | None | None | None | None |
| 0° C. | None | None | None | None | None | None |

TABLE 8

|  | EXAMPLE | | | |
|---|---|---|---|---|
|  | 7 | 8 | 9 | 10 |
| Physical properties in a normal state | | | | |
| $M_{100}$ (kgf/cm²) | 89 | 47 | 88 | 48 |
| $T_B$ (kgf/cm²) | 189 | 167 | 191 | 162 |
| $E_B$ (%) | 272 | 428 | 275 | 420 |
| $H_S$ (JIS A) | 79 | 78 | 78 | 78 |
| Compression set | | | | |
| 70° C. × 22 Hr (%) | 25 | 52 | 24 | 51 |
| 100° C. × 22 Hr (%) | 46 | 61 | 46 | 61 |
| Dynamic characteristics | | | | |
| $Kd_{100}/Ks$ | 3.44 | 4.02 | 3.45 | 4.05 |
| loss factor | 0.254 | 0.277 | 0.255 | 0.279 |
| Pull-out strength (friction coefficient) (kgf) | | | | |
| Room temperature | 81 | 66 | 84 | 68 |

TABLE 8-continued

|  | EXAMPLE | | | |
|---|---|---|---|---|
|  | 7 | 8 | 9 | 10 |
| 0° C. | 88 | 80 | 89 | 80 |
| 70° C. | 54 | 50 | 56 | 52 |
| Roll workability | O | O | O | O |
| Occurrence of noise | | | | |
| Room temperature | None | None | None | None |
| 0° C. | None | None | None | None |

TABLE 9

|  | EXAMPLE | | | |
|---|---|---|---|---|
|  | 11 | 12 | 13 | 14 |
| Physical properties in a normal state | | | | |
| $M_{100}$ (kgf/cm$^2$) | 84 | 46 | 85 | 80 |
| $T_B$ (kgf/cm$^2$) | 185 | 164 | 187 | 184 |
| $E_B$ (%) | 270 | 424 | 260 | 280 |
| $H_S$ (JIS A) | 79 | 75 | 78 | 79 |
| Compression set | | | | |
| 70° C. × 22 Hr (%) | 25 | 52 | 32 | 25 |
| 100° C. × 22 Hr (%) | 46 | 61 | 48 | 47 |
| Dynamic characteristics | | | | |
| $Kd_{100}/Ks$ | 3.48 | 4.02 | 3.47 | 3.42 |
| loss factor | 0.260 | 0.276 | 0.259 | 0.254 |
| Pull-out strength (friction coefficient) (kgf) | | | | |
| Room temperature | 56 | 54 | 58 | 57 |
| 0° C. | 84 | 64 | 85 | 85 |
| 70° C. | 53 | 52 | 56 | 54 |
| Roll workability | O | O | O | O |
| Occurrence of noise | | | | |
| Room temperature | None | None | None | None |
| 0° C. | None | None | None | None |

TABLE 10

|  | COMPRATIVE EXAMPLE | | | |
|---|---|---|---|---|
|  | 1 | 2 | 3 | 4 |
| Physical properties in a normal state | | | | |
| $M_{100}$ (kgf/cm$^2$) | 80 | 64 | 71 | 47 |
| $T_B$ (kgf/cm$^2$) | 194 | 179 | 173 | 169 |
| $E_B$ (%) | 272 | 280 | 237 | 399 |
| $H_S$ (JIS A) | 80 | 77 | 77 | 77 |
| Compression set | | | | |
| 70° C. × 22 Hr (%) | 25 | 26 | 22 | 52 |
| 100° C. × 22 Hr (% | 45 | 47 | 45 | 60 |
| Dynamic characteristics | | | | |
| $Kd_{100}/Ks$ | 3.44 | 3.81 | 3.86 | 4.07 |
| loss factor | 0.254 | 0.252 | 0.259 | 0.282 |
| Pull-out strength (friction coefficient) (kgf) | | | | |
| Room temperature | 405 | 165 | 204 | 158 |
| 0° C. | 550 | 145 | 185 | 170 |
| 70° C. | 103 | 100 | 103 | 109 |
| Roll workability | O | O | O | O |
| Occurrence of noise | | | | |
| Room temperature | occur | occur | occur | occur |

TABLE 10-continued

|  | COMPRATIVE EXAMPLE | | | |
|---|---|---|---|---|
|  | 1 | 2 | 3 | 4 |
| 0° C. | occur | occur | occur | occur |

TABLE 11

|  | COMPARATIVE EXAMPLE | |
|---|---|---|
|  | 5 | 6 |
| Physical properties in a normal state | | |
| $M_{100}$ (kgf/cm$^2$) | 73 | 50 |
| $T_B$ (kgf/cm$^2$) | 173 | 166 |
| $E_B$ (%) | 204 | 310 |
| $H_S$ (JIS A) | 77 | 77 |
| Compression set | | |
| 70° C. × 22 Hr (%) | 26 | 29 |
| 100° C. × 22 Hr (%) | 46 | 51 |
| Dynamic characteristics | | |
| $Kd_{100}/Ks$ | 3.83 | 4.08 |
| loss factor | 0.257 | 0.260 |
| Pull-out strength (friction coefficient) (kgf) | | |
| Room temperature | 395 | 57 |
| 0° C. | 505 | 58 |
| 70° C. | 101 | 41 |
| Roll workability | O | X |
| Occurrence of noise | | |
| Room temperature | occur | none |
| 0° C. | occur | none |

From the results of the above tables 7 to 11, the sample of COMPARATIVE EXAMPLE 7 was low in friction coefficient, however, bad in roll workability. And also, the samples of other COMPARATIVE EXAMPLES were very high in friction coefficient at all temperature range and at the same time caused noise. On the other hand, the samples of EXAMPLES, wherein unsaturated fatty acid amide was added, showed low friction coefficient not only at room temperature but also at low temperature range around 0° C. And also, the samples of EXAMPLES, wherein N-substitutive unsaturated fatty acid amide was added, showed low friction coefficient at a high temperature range not less than 70° C. Furthermore, samples, wherein both of unsaturated fatty acid amide and N-substitutive unsaturated fatty acid amide were added, showed low friction coefficient, without mentioning at normal temperature, not only at lower ranged temperature of 0° to 70° C., but also high ranged temperature. Thus, it is found out that reduction in friction coefficient was realized in samples of EXAMPLES at other temperature than normal temperature. In addition, it was also found out that samples of EXAMPLES did not deteriorate physically if unsaturated fatty acid amide or/and N-substitutive unsaturated fatty acid amide was/were contained.

What is claimed is:

1. A vibration insulating device comprising a metallic fitting having an opening therein, an insulator bushing having a hole therethrough and mounted within said opening of said fitting, and a metallic bar extending through the hole in said insulator and mounted for rotation therein, said insulator comprising a rubber composition which comprises natural rubber and at least one compound selected from the group consisting of unsaturated fatty acid amide and N-substituted unsaturated fatty acid amide.

2. A vibration insulating device according to claim 1, wherein at least one of said unsaturated fatty acid amide and N-substituted unsaturated fatty acid amide is present within a range of 1 to 20 weight % of the total weight of the rubber composition.

3. A vibration insulating device comprising a metallic fitting having a opening therein, an insulator bushing having a hole therethrough and mounted within said opening of said fitting, and a metallic bar extending through the hole in said insulator and mounted for rotation therein, said insulator comprising a rubber composition which comprises natural rubber, at least one unsaturated fatty acid amide and at least one N-substituted unsaturated fatty acid amide.

4. A vibration insulating device according to claim 1 wherein the metallic bar is a stabilizer bar.

* * * * *